United States Patent
Yang et al.

(10) Patent No.: US 10,639,845 B2
(45) Date of Patent: May 5, 2020

(54) PRINTING MODULE AND THREE-DIMENSIONAL PRINTING APPARATUS USING THE SAME

(71) Applicants: XYZprinting, Inc., New Taipei (TW); Kinpo Electronics, Inc., New Taipei (TW)

(72) Inventors: Chung-Chih Yang, New Taipei (TW); Chien-Lun Wu, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 15/871,019

(22) Filed: Jan. 14, 2018

(65) Prior Publication Data

US 2019/0176392 A1 Jun. 13, 2019

(30) Foreign Application Priority Data

Dec. 11, 2017 (CN) .......................... 2017 1 1307878

(51) Int. Cl.
*B29C 64/236* (2017.01)
*B33Y 30/00* (2015.01)
(Continued)

(52) U.S. Cl.
CPC .......... *B29C 64/236* (2017.08); *B29C 64/118* (2017.08); *B29C 64/209* (2017.08);
(Continued)

(58) Field of Classification Search
CPC ... B29C 64/236; B29C 64/118; B29C 64/232; B29C 64/295; B29C 64/209;
(Continued)

(56) References Cited

U.S. PATENT DOCUMENTS

2010/0247703 A1   9/2010  Shi et al.
2015/0137401 A1*  5/2015  Comb .................... B23Q 3/155
                                              264/39
(Continued)

FOREIGN PATENT DOCUMENTS

DE   102016108351   11/2016
WO      2017132767    8/2017

OTHER PUBLICATIONS

"Search Report of Europe Counterpart Application", dated Nov. 16, 2018, p. 1-p. 8.
(Continued)

*Primary Examiner* — Michael N Orlando
*Assistant Examiner* — Abhishek A Patwardhan
(74) *Attorney, Agent, or Firm* — JCIPRNET (57) ABSTRACT

A printing module and a three-dimensional printing apparatus using the same are provided. The three-dimensional apparatus includes a rack with a printing region and a standby region and a control module. The printing module includes a carriage assembly disposed at the rack and is electrically connected to the control module, a first supporting stand disposed at the carriage assembly to be driven thereby, at least one second supporting stand disposed at the standby region, at least one printing head assembly electrically connected to the control module and having a first buckling portion, and a quick release driving assembly disposed at the first supporting stand and electrically connected to the control module. The control module drives the quick release driving assembly to pick and place the printing head assembly between the first supporting stand and the second supporting stand.

17 Claims, 10 Drawing Sheets

(51) Int. Cl.
*B29C 64/209* (2017.01)
*B29C 64/118* (2017.01)
*B29C 64/259* (2017.01)
*B33Y 10/00* (2015.01)
*B29C 64/232* (2017.01)
*B29C 64/295* (2017.01)
*B33Y 40/00* (2020.01)

(52) U.S. Cl.
CPC .......... *B29C 64/232* (2017.08); *B29C 64/259* (2017.08); *B29C 64/295* (2017.08); *B33Y 10/00* (2014.12); *B33Y 30/00* (2014.12); *B33Y 40/00* (2014.12)

(58) Field of Classification Search
CPC ....... B29C 64/25; B29C 64/20; B29C 64/227; B29C 64/205; B29C 64/171; B29C 64/124; B29C 64/141; B29C 64/10; B29C 64/106; B33Y 30/00; B33Y 40/00
See application file for complete search history.

(56) References Cited

U.S. PATENT DOCUMENTS

| | | | |
|---|---|---|---|
| 2016/0136893 A1* | 5/2016 | Chang | B29C 31/04 425/150 |
| 2016/0236408 A1* | 8/2016 | Wolf | B33Y 30/00 |
| 2017/0043536 A1 | 2/2017 | Schmehl et al. | |
| 2017/0266876 A1 | 9/2017 | Hocker | |
| 2018/0029307 A1* | 2/2018 | Share | B29C 48/87 |
| 2018/0200955 A1* | 7/2018 | Hoelldorfer | B33Y 70/00 |
| 2019/0118467 A1* | 4/2019 | Neboian | B33Y 10/00 |

OTHER PUBLICATIONS

"Office Action of Japan Counterpart Application," dated Aug. 27, 2019, p. 1-p. 5.

* cited by examiner

PRINTING MODULE AND THREE-DIMENSIONAL PRINTING APPARATUS USING THE SAME

CROSS-REFERENCE TO RELATED APPLICATION

This application claims the priority benefit of China application serial no. 201711307878.X, filed on Dec. 11, 2017. The entirety of the above-mentioned patent application is hereby incorporated by reference herein and made a part of this specification.

BACKGROUND

1. Technical Field

The disclosure relates to a printing module and a three-dimensional printing apparatus using the same.

2. Description of Related Art

As technology advances in recent years, a variety of methods that utilize additive manufacturing technology (e.g. layer-by-layer model construction) to build three-dimensional (3-D) physical models have been proposed. Generally, the additive manufacturing technology is to transfer data of the design of a 3-D model, which is constructed by software such as computer-aided design (CAD), to multiple thin (quasi-two-dimensional) cross-sectional layers that are stacked in sequence.

Currently, many methods for forming the thin cross-sectional layers have been developed. For instance, after a forming material is spray coated or extruded on a platform according to a message of each of the thin cross-sectional layers, the forming material is hardened to form the thin cross-sectional layers, and a three-dimensional object may thus be formed after the thin cross-sectional layers are stacked layer by layer. In addition, a color nozzle may further be installed on a printing apparatus, as such, the thin cross-sectional layers or the three-dimensional object may be colored during the process or after the process. Alternatively, the three-dimensional object may also be made by using different forming materials.

As described above, when printing the three-dimensional object, how the related structures smoothly color the forming material or switch to use a different forming material without affecting the quality and efficiency of three-dimensional printing have become an important issue for the industry.

SUMMARY

The disclosure provides a printing module of a three-dimensional printing apparatus capable of picking and placing different printing head assemblies through a quick release driving assembly to achieve quick disassembling and assembling effect, and the printing head assembly may also be maintained at a quasi-startup state in a standby mode for enhancing pre-printing startup efficiency.

According to an embodiment of the disclosure, a printing module is adapted for a three-dimensional printing apparatus. The three-dimensional apparatus includes a rack and a control module, and the rack has a printing region and a standby region. The printing module includes a carriage assembly, a first supporting stand, at least one second supporting stand, at least one printing head assembly, and a quick release driving assembly. The carriage assembly is disposed at the rack and is electrically connected to the control module. The first supporting stand is disposed at the carriage assembly and is driven. The at least one second supporting stand is disposed at the standby region. The at least one printing head assembly is electrically connected to the control module and has a first buckling portion. The quick release driving assembly is disposed at the first supporting stand and is electrically connected to the control module. The quick release driving assembly has a second buckling portion controlled by the control module to be buckled to or released from the first buckling portion, such that the at least one printing head assembly is buckled to or released from first supporting stand. The control module drives the first supporting stand to move from the printing region to the standby region and drives the quick release driving assembly to pick and place the at least one printing head assembly between the first supporting stand and the second supporting stand.

A three-dimensional printing apparatus includes a rack, a control module, a carriage assembly, a first supporting stand, at least one second supporting stand, and at least one printing head assembly. The rack has a printing region and a standby region. The carriage assembly is disposed at the rack and is electrically connected to the control module. The first supporting stand is disposed at the carriage assembly, and the control module drives the first supporting stand through the carriage assembly. The at least one second supporting stand is disposed at the standby region. The least one printing head assembly is detachably assembled to the first supporting stand or the at least one second supporting stand. The at least one printing head assembly includes a printing head and a heater, and the heater is electrically connected to the control module. A solid-state forming material is adapted to be introduced into the printing head and is extruded from the printing head after being heated to a liquid-state forming material through the heater. The control module enables the first supporting stand to move back and forth between the printing region and the standby region through the carriage assembly, so as to pick the at least one printing head assembly from and place the at least one printing head assembly to the at least one second supporting stand. The heater continues to heat the forming material when the at least one printing head assembly is carried on the first supporting stand or the at least one second supporting stand.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the present preferred embodiments of the disclosure, examples of which are illustrated in the accompanying drawings. Wherever possible, the same reference numbers are used in the drawings and the description to refer to the same or like parts.

Figure 1:
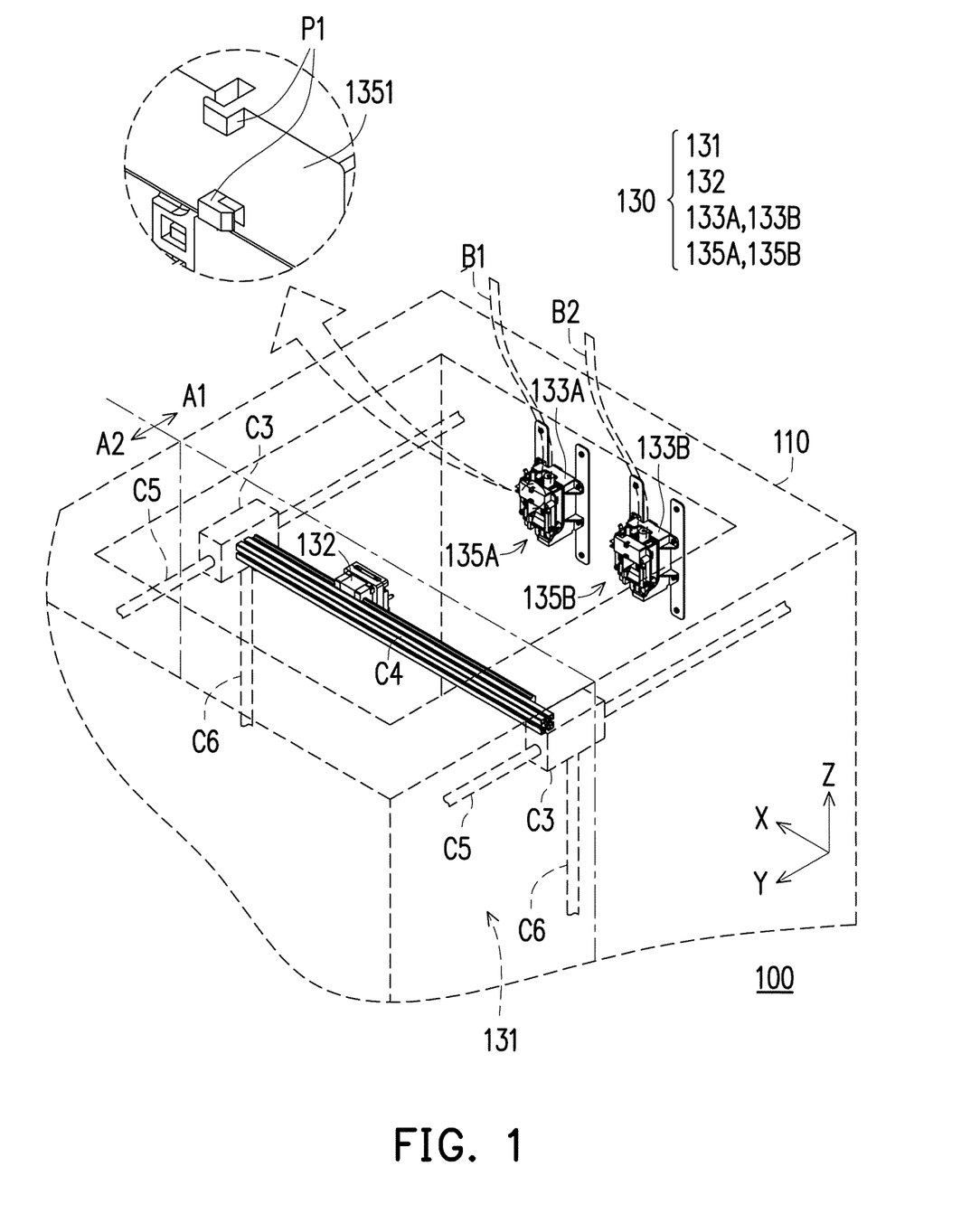
FIG. 1 is a local schematic view of a three-dimensional printing apparatus according to an embodiment of the disclosure.
Figure 2:
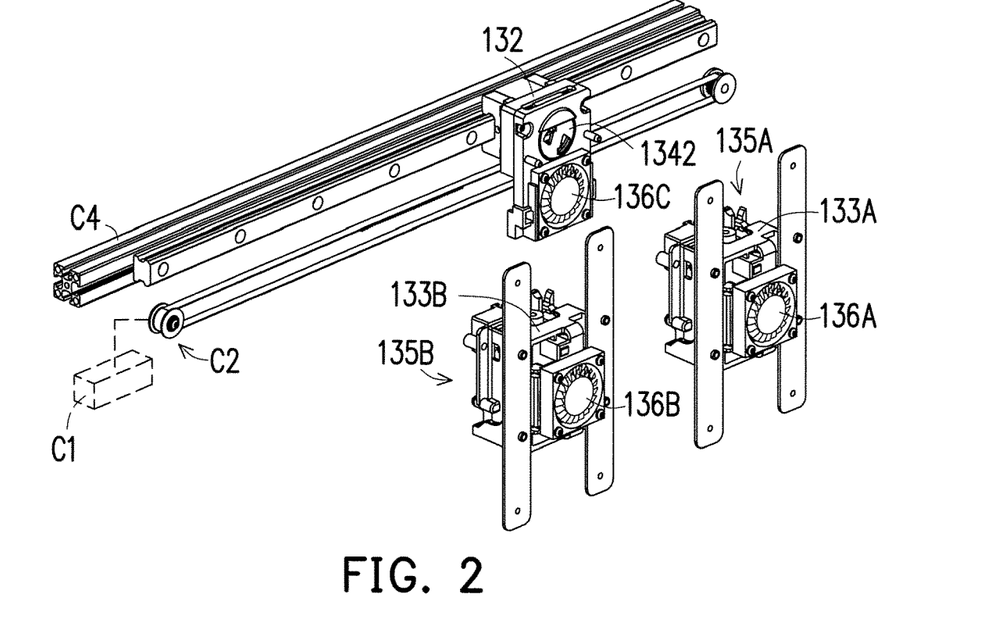
FIG. 2 is a local schematic view of a printing module of FIG. 1 from another view angle.
Figure 3:
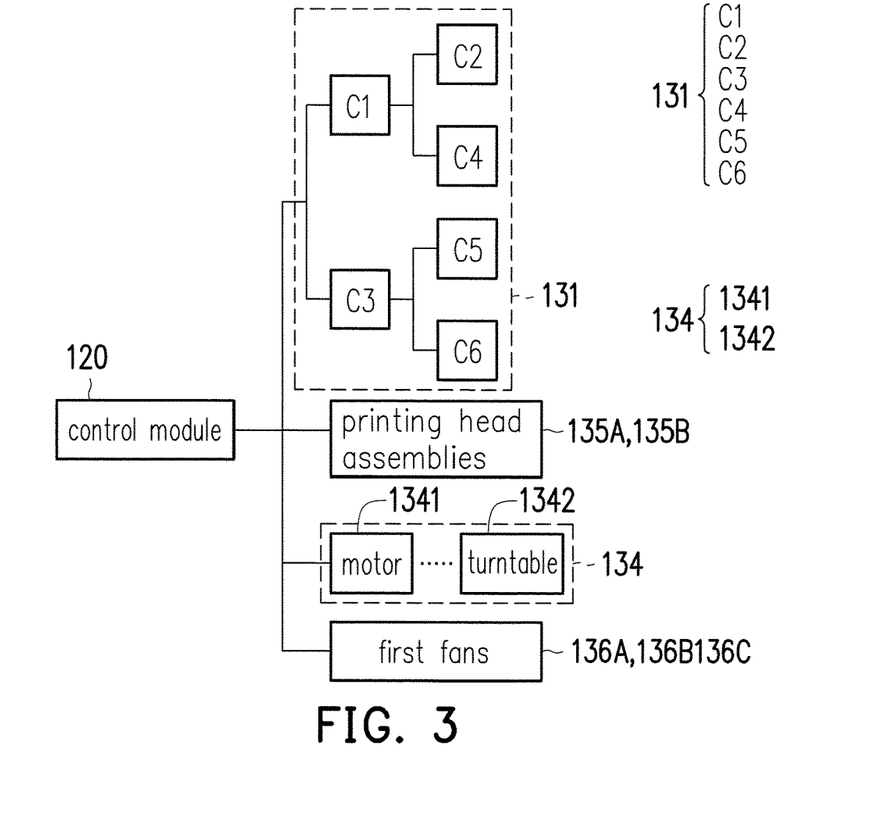
FIG. 3 is diagram illustrating connections of related members in the three-dimensional printing apparatus of FIG. 1.

FIG. 1 is a local schematic view of a three-dimensional printing apparatus according to an embodiment of the disclosure. FIG. 2 is a local schematic view of a printing module of FIG. 1 from another view angle. FIG. 3 is diagram illustrating connections of related members in the three-dimensional printing apparatus of FIG. 1, wherein the solid lines refer to electrical relations, and the dotted lines refer to structural relations. A Cartesian coordinate X-Y-Z is also provided herein for ease of structural description. With reference to FIG. 1 to FIG. 3 together, an object is formed by a three-dimensional printing apparatus 100 using fused deposition modeling (FDM), for example, in this embodiment, and the FDM is a method of heating and melting a variety of thermal-melt filament (strip)-shaped materials (wax, ABS, nylon, etc., referred to as "forming material" hereinafter). The three-dimensional printing apparatus 100 includes a rack 110, a control module 120, and a printing module 130. The rack 110 is divided into a printing region A2 and a standby region A1. The printing module 130 includes a carriage assembly 131, a first supporting stand 132, at least one second supporting stand (a second supporting stand 133A and a second supporting stand 133B are taken as an example but are not limited thereto), at least one printing head assembly (a printing head assembly 135A and a printing head assembly 135B are taken as an example but are not limited thereto), and a quick release driving assembly 134. The second supporting stands 133A and 133B are disposed at the standby region A1 of the rack 110, and the printing head assemblies 135A and 135B are electrically connected to the control module respectively through a cable B1 and a cable B2 (shown in FIG. 1).

The carriage assembly 131 is disposed at the rack 110 and is electrically connected to the control module 120. Herein, the carriage assembly 131 includes components C1 to C6, wherein the component C4 is, for example, a track allowing the first supporting stand 132 to be slidably assembled thereon, the component C1 is, for example, a motor electrically connected to the control module 120, and the component C2 is, for example, a pulley structure enabling the first supporting stand 132 to be bonded onto a belt of the component C2. As such, the control module 120 can drive the first supporting stand 132 to move along an X-axis through the components C1, C2, and C4. Further, the component C4 can move between the components C5 and C6 through the component C3 (e.g., a driving motor set), wherein the component C4 is electrically connected to the control module 120. As such, the first supporting stand 132 may further be driven to move along a Y-axis and a Z-axis through collocation of the component C3, C5, and C6. Therefore, the control module 120 may smoothly drive the first supporting stand 132 to move in a three-dimensional way in the rack 110 through the carriage assembly 131. Nevertheless, the disclosure is not intended to limit each of the components of the carriage assembly 131. Any existing technologies that can drive the first supporting stand 132 to move in a three-dimensional way can be employed in this embodiment.

Figure 4:
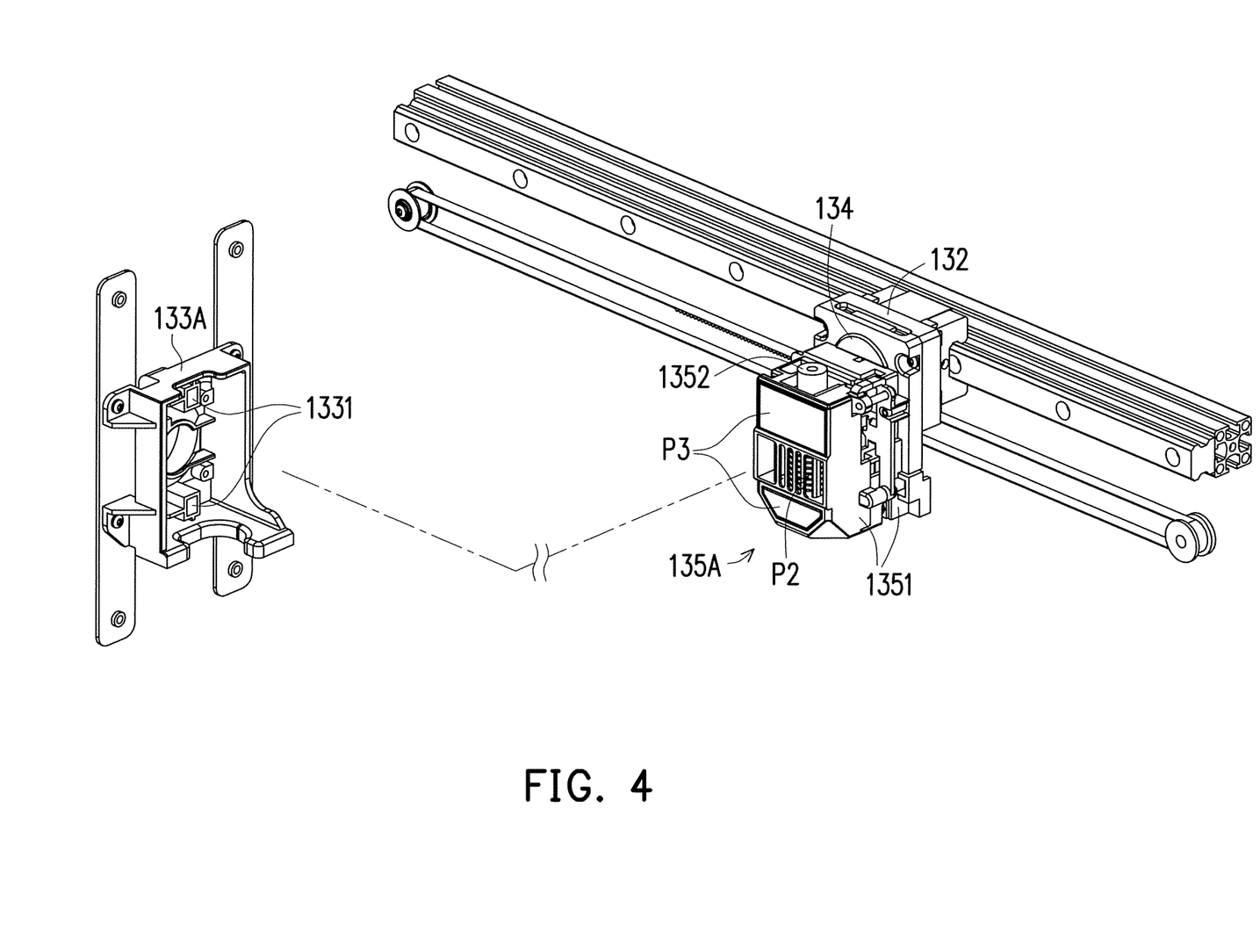
FIG. 4 is a local schematic view illustrating the three-dimensional printing apparatus of FIG. 1 in another state.
Figure 5:
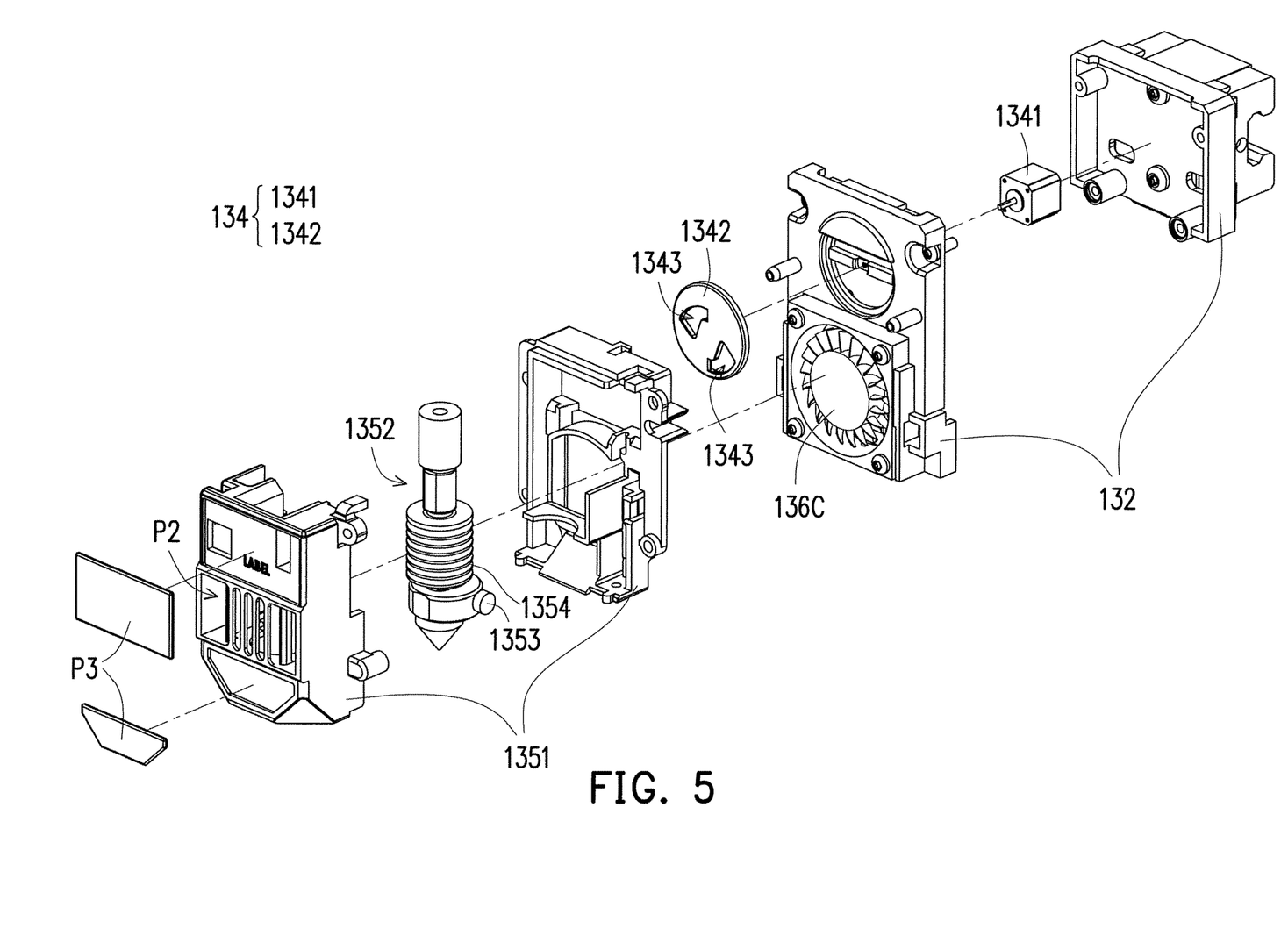
FIG. 5 is an exploded view illustrating the printing head assemblies and the quick release driving assembly of FIG. 4.

FIG. 4 is a local schematic view illustrating the three-dimensional printing apparatus of FIG. 1 in another state and is illustrated to describe a printing state of the printing module 130. The printing head assembly 135A is taken as an example. The printing head assembly 135A is moved away from the second supporting stand 133A and is positioned at the first supporting stand 132 instead, and such state is different from the state shown in FIG. 1 and FIG. 2 in which the printing head assemblies 135A and 135B are both in the standby state. FIG. 5 is an exploded view illustrating the printing head assemblies and the quick release driving assembly of FIG. 4. With reference to FIG. 3 to FIG. 5 together, in this embodiment, the printing head assemblies 135A and 135B respectively include: a housing 1351, a printing head 1352, a heater 1353, and a heat dissipation fin 1354. The heater 1353 and the heat dissipation fin 1354 are respectively disposed at the printing head 1352 and are accommodated inside the housing 1351 together. A solid-state material is adapted to be introduced into the printing head 1352 via an upper end thereof, and is extruded from a lower end of the printing head 1352 through a related driving member (not shown) after being heated to a liquid-state forming material by the heater 1353. Herein, the control module 120 is electrically connected to the related driving member and the heater 1353, and that operations such as heating and extruding the forming material may be completed accordingly.

Further, as described above, plural printing head assemblies (the printing heads adapted for different forming materials as described above or coloring heads providing different colors, and the two printing head assemblies 135A and 135B are taken as an example in this embodiment, and types and numbers thereof are not limited) are disposed at the rack 110 together in order to allow the three-dimensional printing apparatus 100 to be widely applied. The printing head assembly performing the printing operation is adapted to be carried on the first supporting stand 132 and be driven by the carriage assembly 131. Other printing head assemblies performing related printing or coloring operations but are not in use in the printing region A2 may be temporarily disposed at the second supporting stands 133A and 133B. Simultaneously, through collocation of the quick release driving assembly 134, the carriage assembly 131 of this embodiment may accordingly drive the first supporting stand 132 to move back and forth between the printing region A2 and the printing region A1, and thus, the printing head assemblies may be picked and placed among the first supporting stand 132 and the second supporting stands 133A and 133B. Herein, a number of the printing head assemblies and a number of the second supporting stands are plural, and the number of the second supporting stands is preferably greater than or equal to the number of the printing head assemblies.

With reference to FIG. 4 and FIG. 5 together with FIG. 1, collocation of related members is also required in this embodiment in order to enable the printing head assemblies 135A and 135B to be picked and placed smoothly among the first supporting stand 132 and the second supporting stands 133A and 133B. As shown in FIG. 1, the printing head assemblies 135A and 135B respectively have first buckling portions P1 and first magnetic attraction portions P3 disposed on the housings 1351, and the first buckling portions P1 and the first magnetic attraction portions P3 are located at two opposite sides of the housings 1351. Correspondingly, the second supporting stand 133A and 133B respectively have second magnetic attraction portions 1331 (the second supporting stand 133A is taken as an example in FIG. 4), and the quick release driving assembly 134 is disposed at the first supporting stand 132. As such, in the printing head assemblies 135A and 135B, the first buckling portions P1 correspond to the quick release driving assembly 134 on the first supporting stand 132, and the first magnetic attraction portions P3 correspond to the second magnetic attraction portions 1331 on the second supporting stands 133A and 133B. Related picking and placing operations can thus be performed through such collocation.

Figure 6A:
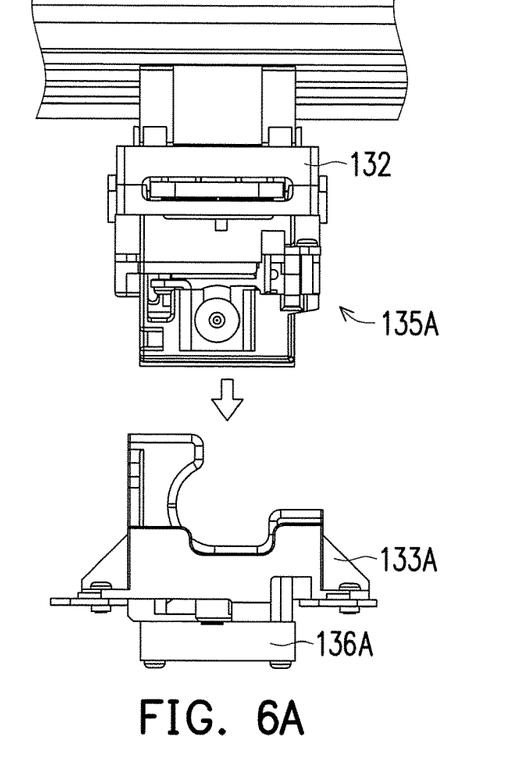
FIG. 6A to FIG. 6D are schematic views illustrating movements of a printing head assembly.
Figure 6B:
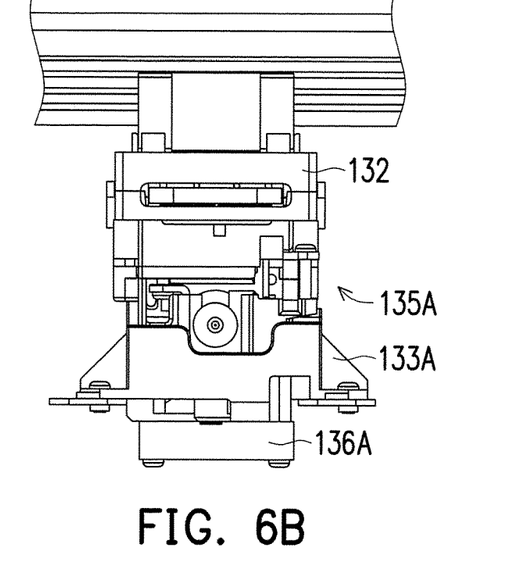
Figure 6C:
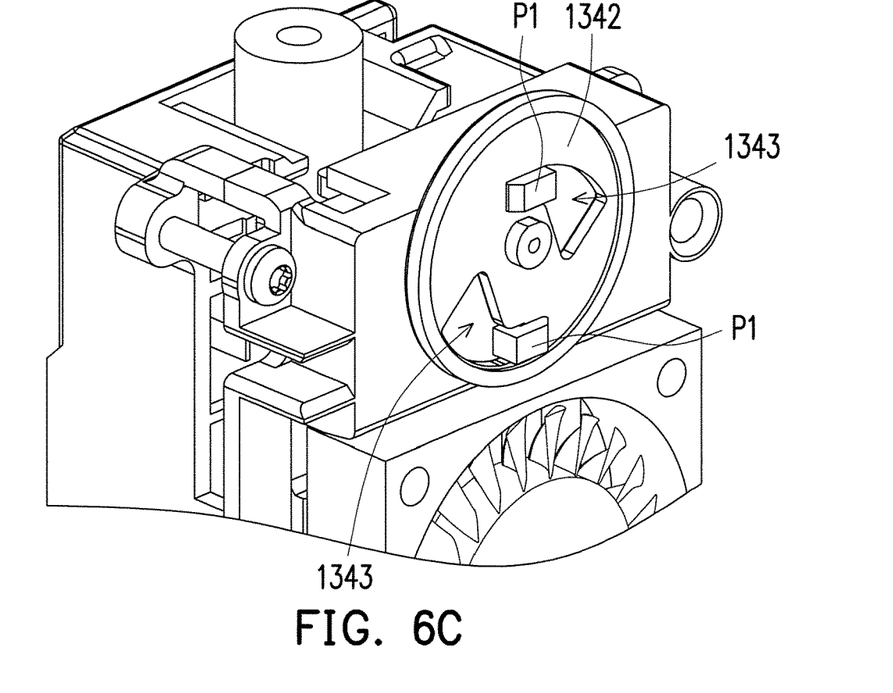
Figure 6D:
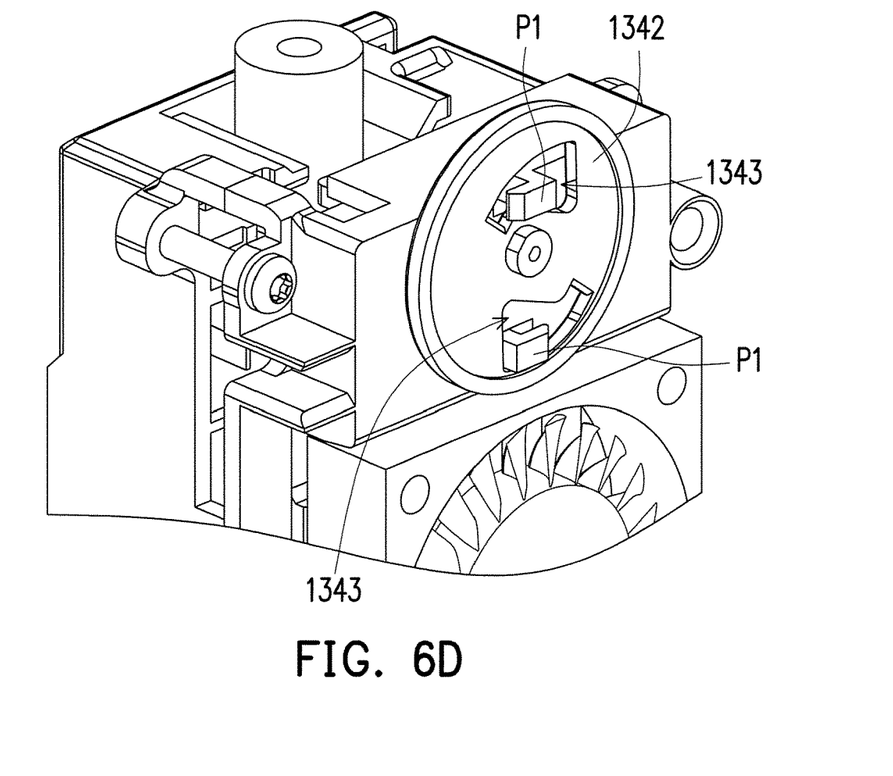

FIG. 6A to FIG. 6D are schematic views illustrating movements of a printing head assembly, wherein FIG. 6C corresponds to a state shown in FIG. 6A, and FIG. 6D corresponds to a state shown in FIG. 6B. With reference to FIG. 6A to FIG. 6C together with FIG. 4 and FIG. 5, the quick release driving assembly 134 includes a motor 1341 and a turntable 1342 in this embodiment. The motor 1341 is electrically connected to the control module 120, the turntable 1342 is connected to the motor 1341, and second buckling portions 1343 are disposed on the turntable 1342. The second buckling portions 1343 are, for example, gradual expanding holes, and the first buckling portions P1 are, for example, column type hooks. As such, when the motor 1341 drives the turntable 1342 to rotate, diameters of the gradual expanding holes change relative to the first buckling portions P1. Therefore, when the printing head assembly 135A is assembled to and carried on the first supporting stand 132 as shown in FIG. 6A, the control module 120 enables the second buckling portions 1343 to be buckled to the first buckling portions P1 through the quick release driving assembly 134 at the time being. That is, the column type hooks opposite to each other are engaged with narrow ends of the gradual expanding holes as shown in FIG. 6C. Next, when the printing head assembly 135A is intended to be replaced, the control module 120 drives the carriage assembly 131 to drive the first supporting stand 132 to move to the second supporting stand 133A until the printing head assembly 135A is carried on the second supporting stand 133A. At this time, since the first magnetic attraction portions P3 and the second magnetic attraction portions 1331 attract each other as shown in FIG. 4, the printing head assembly 135A is positioned at the second supporting stand 133A. At this time, the control module 120 enables the column type hooks to move away from the narrow ends of the gradual expanding holes further through the quick release driving assembly 134, such that the printing head assembly 135A and the first supporting stand 132 are smoothly separated from each other, while the printing head assembly 135A is smoothly placed at the second supporting stand 133A. The printing head assembly 135A is thereby removed from the first supporting stand 132 as shown in FIG. 1.

Next, the control module 120 drives the first supporting stand 132 to move to the other supporting stand 133B. The above-mentioned operations of FIG. 6A to FIG. 6D are then performed in a reverse order, meaning that when the first supporting stand 132 moves to the second supporting stand 133B and leans against the other printing head assembly 135B, the first buckling portions P1 of the printing head assembly 135B penetrate through the gradual expanding holes on the turntable 1342. Next, when the control module 120 drives the turntable 1342 to rotate and that the column type hooks are buckled to the narrow ends of the gradual expanding holes, the printing head assembly 135B is buckled to the first supporting stand 132. At this time, the control module 120 may enable the first supporting stand 132 to move away from the second supporting stand 133B only through the carriage assembly 131. A buckling force between the first buckling portions P1 and the second buckling portions 1343 is greater than an attraction force between the first magnetic attraction portions P3 and the second magnetic attraction portions 1331; thereby, the printing head assembly 135B may smoothly move away from the second supporting stand 133B, and the printing head assembly may thus be replaced.

In other words, in the three-dimensional printing apparatus 100, the printing module 130 may enable the printing head assemblies 135A and 135B to be detachably disposed at the first supporting stand 132 and the second supporting stands 133A and 133B through the plural second supporting stands 133A and 133B and the printing head assemblies 135A and 135B together with collocation of the quick release driving assembly 134 and the corresponding engaging structure and the magnetic attraction structure. As such, when the control module 120 drives the carriage assembly 131 and enables the first supporting stand 132 to move back and forth between the printing region A2 and the standby region A1, the printing head assemblies 135A and 135B may be picked and placed by turns.

With reference to FIG. 2 and FIG. 3 again together with FIG. 1, since the printing head assemblies 135A and 135B are respectively connected to the control module 120 through the cables B1 and B2, the control module 120 can drive the heaters 1353 to heat the forming materials in the printing heads 1352 respectively through the cables B1 and B2. That is, as the three-dimensional printing apparatus 100 of this embodiment has the plural printing head assemblies 135A and 135B, in addition to a general printing process in which the forming material is heated to perform the three-dimensional printing operation through driving the heater 1353 of the printing head assembly 135A or 135B on the first supporting stand 132 by the control module 120, the control module 120 of this embodiment may accordingly heat the heater 1353 not in the printing state of the printing head assembly 135B or 135A located at the standby region A1 (on the second supporting stands 133A and 133B). A temperature of the heater 1353 is thus maintained at a predetermined temperature.

For instance, when the printing head assembly 135A is located at the first supporting stand 132 and the printing head assembly 135B is located at the second supporting stand 133B, the control module 120 drives the printing head assembly 135A on the first supporting stand 132, such that, the heater 1353 heats the solid-state forming material to reach a melting temperature (i.e., the printing head assembly 135A reaches a printing temperature), so as to facilitate the three-dimensional printing operation. Simultaneously, the control module 120 may also drive the heater 1353 of the printing head assembly 135B on the second supporting stand 133B, such that, the solid-state forming material is heated to reach a softening temperature (i.e., the printing head assembly 135B reaches a standby temperature) without causing the forming material to melt. That is, the printing temperature (the melting temperature of the forming material)> the standby temperature (the softening temperature of the forming material).

Therefore, when it is intended to change to the printing head assembly 135B for performing the three-dimensional printing, since the printing head assembly 135B is at the standby temperature and thus is not cooled down, less energy is thereby required to drive the heater 1353 and to enable the forming material to reach the melting temperature for performing the three-dimensional printing. A re-activation process required after replacing the printing head assembly is thereby saved. In other words, regardless of being in the printing region A2 or the standby region A1, the heaters 1353 heat both the printing head assemblies 135A and 135B continuously.

It is noted that practically, the heaters 1353 perform the heating operation continuously when being activated. The three-dimensional printing apparatus 100 of this embodiment further includes a plurality of first fans 136A, 136B, and 136C correspondingly disposed at the second supporting stands 133A and 133B and the first supporting stand 132 respectively, so as to enable the forming materials in the printing heads 1352 to be maintained at a specific temperature range. The first fans 136A, 136B, and 136C are electrically connected to the control module 120, so as to dissipate heat for the printing head assemblies 135A and 135B when the printing head assemblies 135A and 135B are carried on the first supporting stand 132 or the second supporting stands 133A and 133B. With reference to FIG. 4 and FIG. 5, in terms of the printing head assemblies 135A and 135B, the housings 1351 have openings P2 in this embodiment. Whether the printing head assemblies 135A and 135B are located at the second supporting stands 133A and 133B or at the first supporting stand 132, the openings P2 together with the first fans 136A, 136B, and 136C are disposed at opposite sides of the heat dissipation fins 1354. Therefore, heat of the heat dissipation fins 1354 may be blown out of the printing head assemblies 135A and 135B through the openings P2 by the first fans 136A, 136B, and 136C.

Figure 7A:
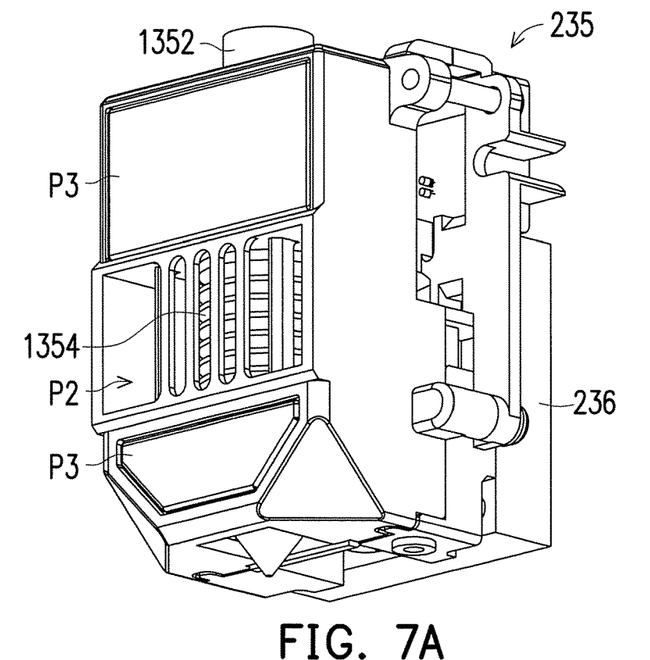
FIG. 7A and FIG. 7B are schematic views illustrating a printing head assembly respectively in different view angles according to another embodiment of the disclosure.
Figure 7B:
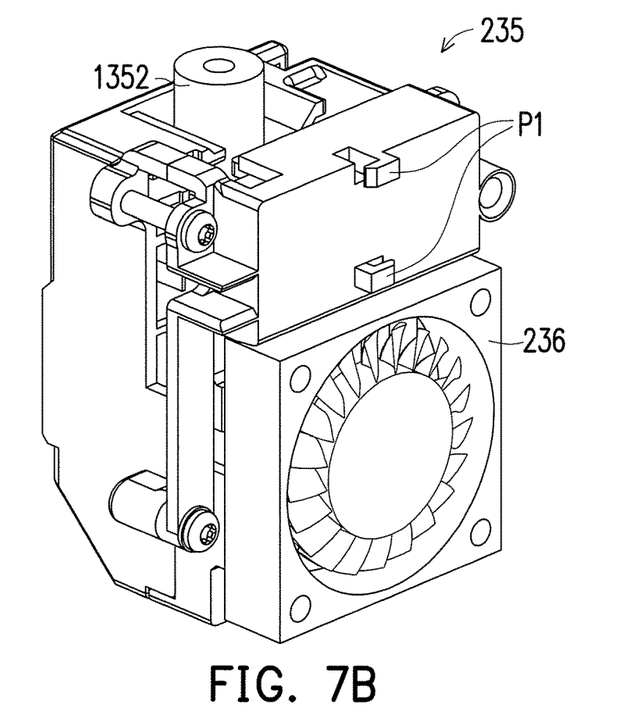

FIG. 7A and FIG. 7B are schematic views illustrating a printing head assembly respectively in different view angles according to another embodiment of the disclosure. With reference to FIG. 7A and FIG. 7B together, a three-dimensional printing apparatus of this embodiment further includes a second fan 236 disposed on a printing head assembly 235. The second fan 236 and the opening P2 are located at two opposite sides of the heat dissipation fin 1354. Further, the second fan 236 is electrically connected to the control module 120. That is, except for the second fan 236, other structures in this embodiment are similar to that of the foregoing embodiments. As the second fan 236 moves simultaneously with the printing head assembly 235, the first fans 136A, 136B, and 136C are not required to be disposed at the first supporting stand 132 or the second supporting stands 133A and 133B.

Figure 8A:
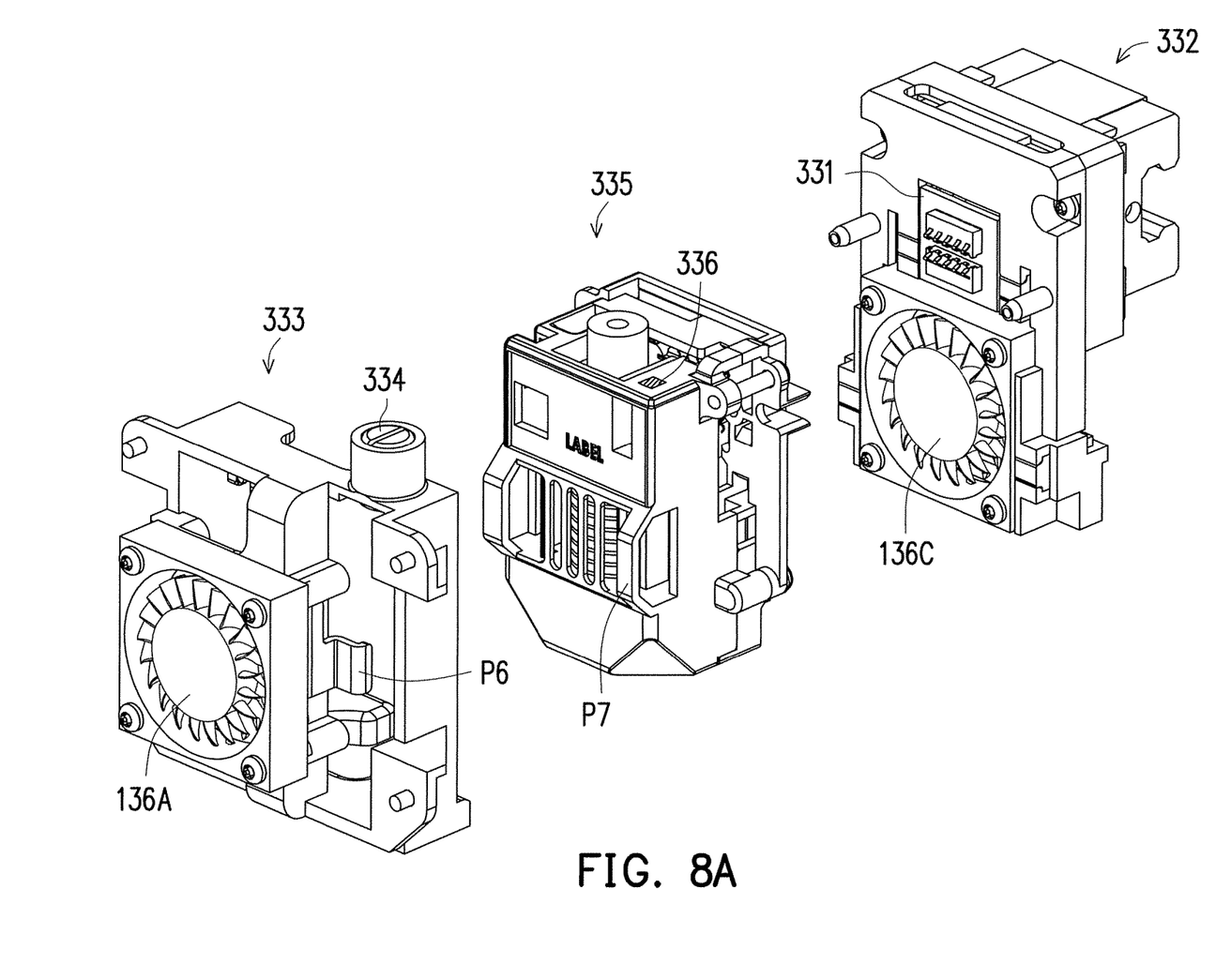
FIG. 8A and FIG. 8B are schematic views illustrating partial members of a printing module in different view angles according to another embodiment of the disclosure.
Figure 8B:
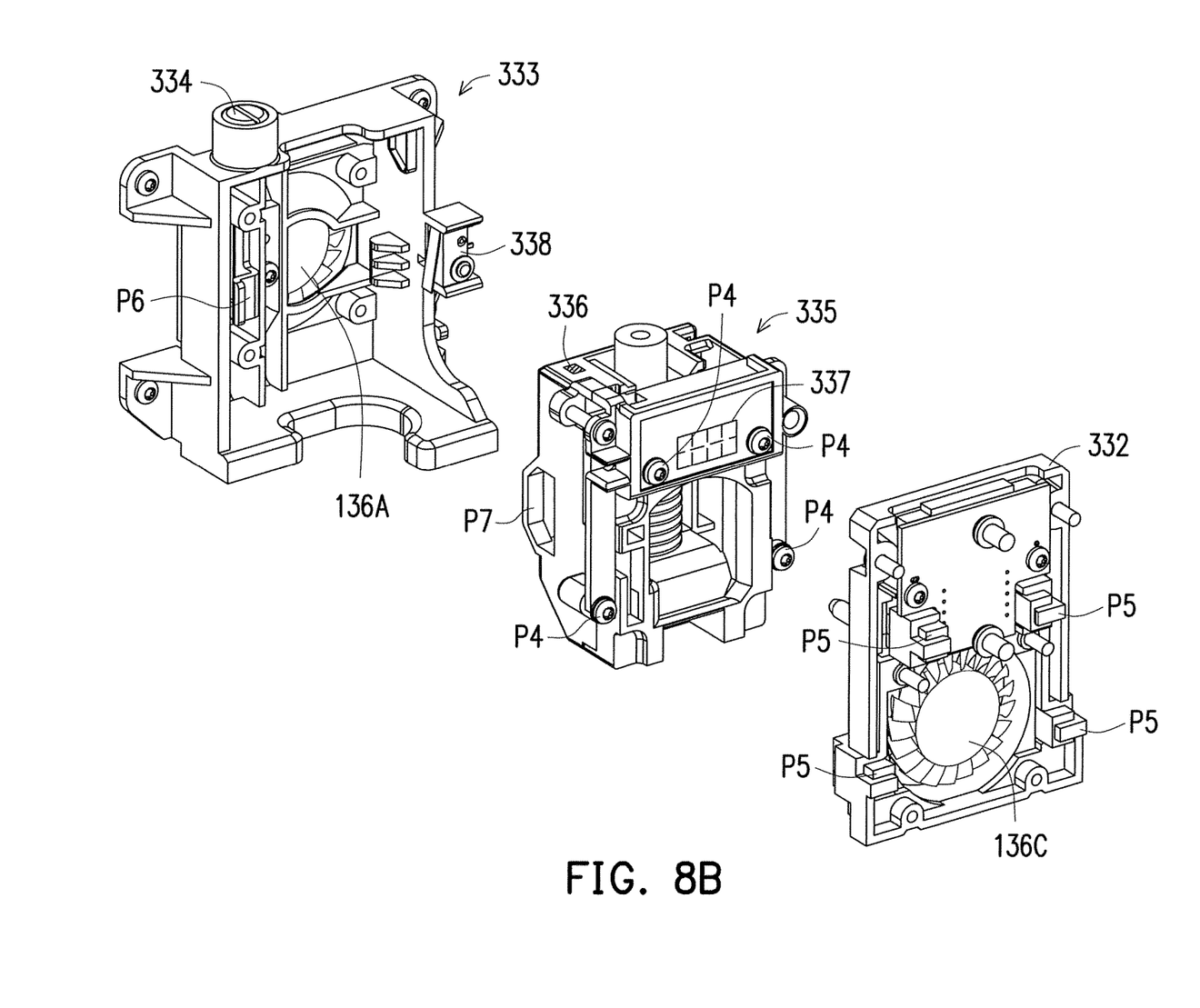
Figure 8C:
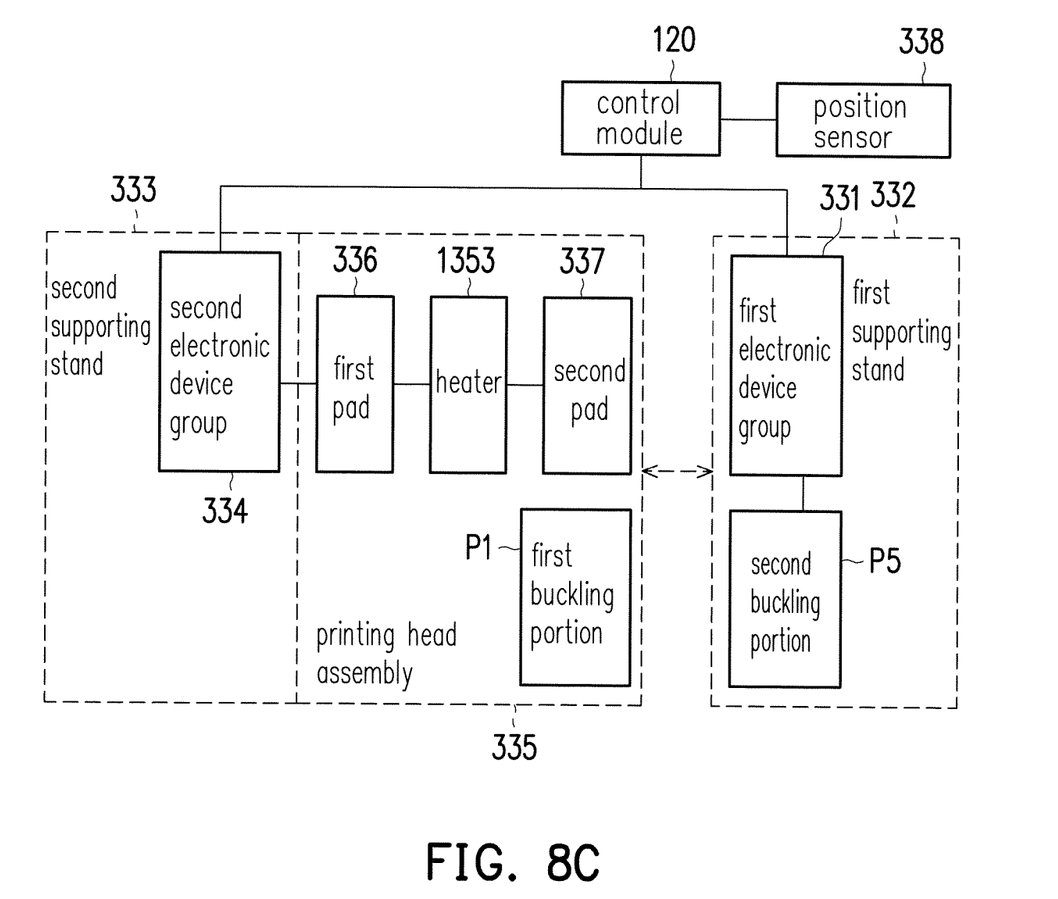
FIG. 8C is a schematic view illustrating relations corresponding to related members in FIG. 8A and FIG. 8B.

FIG. 8A and FIG. 8B are schematic views illustrating partial members of a printing module in different view angles according to another embodiment of the disclosure. FIG. 8C is a schematic view illustrating relations corresponding to related members in FIG. 8A and FIG. 8B. With reference to FIG. 8A to FIG. 8C, a three-dimensional printing apparatus of this embodiment further includes a first electronic device group 331 and a second electronic device group 334. The first electronic device group 331 is disposed at a first supporting stand 332 and is electrically connected to the control module 120, and the second electronic device group 334 is disposed at a second supporting stand 333 and is electrically connected to the control module 120. A printing head assembly 335 has a first pad 336 and a second pad 337 electrically connected to the heater 1353. Accordingly, when the printing head assembly 335 is carried on the first supporting stand 332, the second pad 337 of the printing head assembly 335 is electrically connected to the first electronic device group 331, as such, the control module 120 can drive and control the heater 1353 through the first electronic device group 331. In contrast, when the printing head assembly 335 is carried on the second supporting stand 333, the first pad 336 of the printing head assembly 335 is instead electrically connected to the second electronic device group 334 as shown in FIG. 8C, such that the control module 120 drives and controls the heater 1353 through the second electronic device group 334 instead.

Besides, the first electronic device group 331 of this embodiment further includes an electromagnetic conversion function in addition to the electrical signal transmission function as described above. That is, second buckling portions P5 of this embodiment are a plurality of electromagnetic portions disposed on the first supporting stand and are electromagnetically connected to the first electronic device group 331. First buckling portions P4 of this embodiment are a plurality of magnetic pieces or magnetic attraction pieces of the printing head assembly 335. Therefore, when the printing head assembly 335 is carried on the first supporting stand 332, the control module 120 further drives the first electronic device group 331 to generate an electromagnetic force accordingly to attract the first buckling portions P4 through the second buckling portions P5. As such, the printing head assembly 335 may be firmly assembled to the first supporting stand 332. In contrast, when the printing head assembly 335 is intended to be placed on the second supporting stand 333, the first electronic device group 331 is not enabled to generate the electromagnetic force, such that the printing head assembly 335 is released from the first supporting stand 332. In addition, a third buckling portion P6 disposed on the second supporting stand 333 is correspondingly engaged with a fourth buckling portion P7 of the printing head assembly 335, and that the printing head assembly 335 is smoothly assembled and buckled to the second supporting stand 333. Similar to the description above, an electromagnetic attraction force between the printing head assembly 335 and an electromagnetic portion P5 on the first supporting stand 332 is practically greater than a structural buckling force between the third buckling portion P6 and the fourth buckling portion P7. As such, the printing head assembly 335 may be smoothly picked and placed between the first supporting stand 332 and the second supporting stand 333. In addition, as shown in FIG. 8B, the printing module further includes a sensor 338 disposed at the second supporting stand 333 and electrically connected to the control module 120 through the second electronic device group 334. When the printing head assembly 335 is assembled to the second supporting stand 333, as the printing head assembly 335 structurally triggers the sensor 338, the sensor 338 thus provides a triggering signal to the control module 120. As such, the control module 120 releases a magnetic force generated by the electromagnetic portion through the first electronic device group 331, and the foregoing picking and placing effect is thereby achieved.

In view of the foregoing, in the three-dimensional printing apparatus disclosed in the embodiments of the disclosure, the printing head assemblies may be picked and placed between the first supporting stand and the second supporting stands through the quick release driving assembly and the corresponding buckling portion. That is, plural printing head assemblies may thus be disposed in the three-dimensional printing apparatus. Through temporarily placing the printing head assemblies which are not in use at the second supporting stands of the standby region, the printing head assemblies may be replaced effectively, and that the application range of the three-dimensional printing apparatus may be expanded.

Further, the control module may be electrically connected to the printing head assemblies directly or may be electrically connected to the printing head assemblies indirectly through the supporting stands, allowing the printing head assemblies to be maintained at the predetermined temperature whether the printing head assemblies are in use or are in standby. That is, even the printing head assemblies are in the standby state, the heaters of the printing head assemblies may continue to perform heating through the foregoing electrical connection. The forming materials in the printing head assemblies in the standby mode are maintained at the softening temperature, and thus, when the printing head assemblies are assembled to the first supporting stand and are intended to perform the three-dimensional printing operation, re-activation operation energy and time may be effectively reduced, and thus, efficiency of the three-dimensional printing is accordingly enhanced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A printing module, adapted for a three-dimensional printing apparatus, wherein the three-dimensional printing apparatus comprises a rack and a control module, the rack has a printing region and a standby region, and the printing module comprises:
    a carriage assembly, disposed at the rack and electrically connected to the control module;
    a first supporting stand, disposed at the carriage assembly, the control module driving the first supporting stand through the carriage assembly;
    at least one second supporting stand, disposed at the standby region;
    at least one printing head assembly, electrically connected to the control module, the at least one printing head assembly having a first buckling portion; and
    a quick release driving assembly, disposed at the first supporting stand and electrically connected to the control module, the quick release driving assembly having a second buckling portion, the second buckling portion being controlled by the control module to be buckled to or be released from the first buckling portion so as to buckle the at least one printing head assembly to the first supporting stand or release the at least one printing head assembly from the first supporting stand, wherein the control module drives the first supporting stand to move from the printing region to the standby region and drives the quick release driving assembly to pick and place the at least one printing head assembly between the first supporting stand and the at least one second supporting stand,
    wherein the quick release driving assembly comprises:
        a turntable, disposed at the first supporting stand, the second buckling portion being located at the turntable; and
        a motor, disposed at the first supporting stand and connected to the turntable, the motor being electrically connected to the control module, and the control module driving the turntable to rotate through the motor.

2. The printing module as claimed in claim 1, wherein the first buckling portion is a column type hook or a gradual expanding hole, the second buckling portion is a gradual expanding hole or a column type hook, and the column type hook is adapted to penetrate through the gradual expanding hole and be buckled to a narrow end of the gradual expanding hole, or the column type hook is adapted to be released from the narrow end and be moved away from the gradual expanding hole.

3. The printing module as claimed in claim 1, wherein the at least one printing head assembly comprises:
    a housing, having the first buckling portion;
    a printing head, inserted in the housing; and
    a heater, disposed at the printing head and electrically connected to the control module, a solid-state forming material being adapted to be introduced into the printing head and being extruded from the printing head after being heated to a liquid-state forming material through the heater.

4. The printing module as claimed in claim 3, wherein the housing has an opening, the at least one printing head assembly further comprises a heat dissipation fin disposed at the printing head and adjacent to the heater, the heat dissipation fin corresponds to the opening, and the opening and the first buckling portion are located at two opposite sides of the housing.

5. The printing module as claimed in claim 3, wherein the housing has a first magnetic attraction portion, the first magnetic attraction portion and the first buckling portion are located at two opposite sides of the housing, the at least one second supporting stand has a second magnetic attraction portion, and the first magnetic attraction portion and the second magnetic attraction portion attract each other when the control module drives the first supporting stand to move to the at least one second supporting stand of the standby region to pick and place the at least one printing head assembly and that the at least one printing head assembly is carried on the at least one second supporting stand.

6. The printing module as claimed in claim 5, wherein a buckling force between the first buckling portion and the second buckling portion is greater than an attraction force between the first magnetic attraction portion and the second magnetic attraction portion.

7. The printing module as claimed in claim 3, wherein the heater continues to heat the forming material, and the printing module further comprises:
    a plurality of first fans, respectively disposed at the first supporting stand and the at least one second supporting stand correspondingly so as to dissipate heat for the printing head when the at least one printing head assembly is carried on the first supporting stand or the at least one second supporting stand.

8. The printing module as claimed in claim 3, wherein the heater continues to heat the forming material, and the printing module further comprises:
    a second fan, disposed at the at least one printing head assembly and being moved along with the at least one printing head assembly so as to dissipate heat for the printing head.

9. The printing module as claimed in claim 3, further comprising a cable, one end of the cable being electrically connected to the heater and the printing head, the other end of the cable being electrically connected to the control module.

10. The printing module as claimed in claim 1, wherein the printing module comprises a plurality of second supporting stands and a plurality of printing head assemblies, the printing head assemblies are detachably disposed at the second supporting stands, and the control module enables the first supporting stand to move back and forth between the printing region and the standby region through the carriage assembly so as to pick and place the printing head assemblies by turns.

11. The printing module as claimed in claim 1, wherein the printing module further comprises a first electronic device group disposed at the first supporting stand, the first buckling portion is a magnetic piece or a magnetic attraction piece, the second buckling portion is at least one electromagnetic portion disposed on the first supporting stand and is electrically connected to the first electronic device group, and the control module drives the at least one electromagnetic portion whether or not to generate a magnetic force through the first electronic device group to magnetically attract or release the first buckling portion.

12. The printing module as claimed in claim 11, wherein the heater of the at least one printing head assembly is electrically connected to the control module through the first electronic device group when the at least one printing head assembly is assembled to the first supporting stand.

13. The printing module as claimed in claim 11, wherein the printing module further comprises:
a second electronic device group, disposed at the at least one second supporting stand and electrically connected to the control module;
a third buckling portion, disposed at the at least one second supporting stand, the at least one printing head assembly further comprising a housing and a fourth buckling portion, the first buckling portion and the fourth buckling portion being located at two opposite sides of the housing, the at least one printing head assembly being assembled to the at least one second supporting stand through collocation of the third buckling portion and the fourth buckling portion when the at least one printing head assembly is moved to the at least one second supporting stand, and the heater of the at least one printing head assembly being electrically connected to the control module through the second electronic device group.

14. The printing module as claimed in claim 13, wherein the printing module further comprises a sensor disposed at the at least one second supporting stand and electrically connected to the control module through the second electronic device group, and the control module releases the magnetic force generated by the electromagnetic portion through the first electronic device group when the at least one printing head assembly is assembled to the at least one second supporting stand.

15. A three-dimensional printing apparatus, wherein the three-dimensional printing apparatus comprises:
a rack, having a printing region and a standby region;
a control module:
a carriage assembly, disposed at the rack and electrically connected to the control module;
a first supporting stand, disposed at the carriage assembly, the control module driving the first supporting stand through the carriage assembly;
at least one second supporting stand, disposed at the standby region;
at least one printing head assembly, detachably assembled to the first supporting stand or the at least one second supporting stand, the at least one printing head assembly comprising a first buckling portion, a printing head and a heater, the heater being electrically connected to the control module, a solid-state forming material being adapted to be introduced into the printing head and being extruded from the printing head after being heated to a liquid-state forming material through the heater; and
a quick release driving assembly, disposed at the first supporting stand and electrically connected to the control module, the quick release driving assembly having a second buckling portion, the second buckling portion being controlled by the control module to be buckled to or be released from the first buckling portion so as to buckle the at least one printing head assembly to the first supporting stand or release the at least one printing head assembly from the first supporting stand, the control module enabling the first supporting stand to move back and forth between the printing region and the standby region through the carriage assembly and driving the quick release driving assembly to pick the at least one printing head assembly from and place the at least one printing head assembly to the at least one second supporting stand, the heater continuing to heat the forming material when the at least one printing head assembly is carried on the first supporting stand or the at least one second supporting stand,
wherein the quick release driving assembly comprises:
a turntable, disposed at the first supporting stand, the second buckling portion being located at the turntable; and
a motor, disposed at the first supporting stand and connected to the turntable, the motor being electrically connected to the control module, and the control module driving the turntable to rotate through the motor.

16. The three-dimensional printing apparatus as claimed in claim 15, wherein the three-dimensional printing apparatus further includes a cable, one end of the cable is electrically connected to the heater and the printing head, and the other end of the cable is electrically connected to the control module.

17. The three-dimensional printing apparatus as claimed in claim 15, wherein the three-dimensional printing apparatus further comprises:
a first electronic device group, disposed at the first supporting stand and electrically connected to the control module; and
a second electronic device group, disposed at the at least one second supporting stand and electrically connected to the control module, the heater of the at least one printing head assembly being electrically connected to the control module through the first electronic device group when the at least one printing head assembly is carried on the first supporting stand, the heater of the at least one printing head assembly being electrically connected to the control module through the second electronic device group when the at least one printing head assembly is carried on the at least one second supporting stand.

* * * * *